United States Patent [19]

Brumfield, Jr. et al.

[11] 4,131,932
[45] Dec. 26, 1978

[54] COVER ASSEMBLY FOR PANELBOARD

[75] Inventors: Walter T. Brumfield, Jr., Nicholasville; Norman M. Newsome; George E. Schweikle, both of Lexington, all of Ky.

[73] Assignee: Square D Company, Park Ridge, Ill.

[21] Appl. No.: 842,429

[22] Filed: Oct. 17, 1977

[51] Int. Cl.² .............................................. H02B 1/08
[52] U.S. Cl. .................................... 361/356; 361/360; 220/3.8; 220/323
[58] Field of Search ......................... 220/3.8, 323, 242; 49/169; 174/66, 67; 361/356–363

[56] References Cited

U.S. PATENT DOCUMENTS

| 3,192,447 | 6/1965 | Kehyeres | 361/363 X |
| 3,339,124 | 8/1967 | Jorgensen | 361/356 |
| 3,946,283 | 3/1976 | Meacham et al. | 361/360 |

Primary Examiner—George T. Hall
Attorney, Agent, or Firm—Norton Lesser; Richard T. Guttman

[57] ABSTRACT

The following specification describes a cover for a panelboard with the cover carrying spring biased latch clamp assemblies for engaging the flanges formed on the side walls of the panelboard cabinet.

8 Claims, 8 Drawing Figures

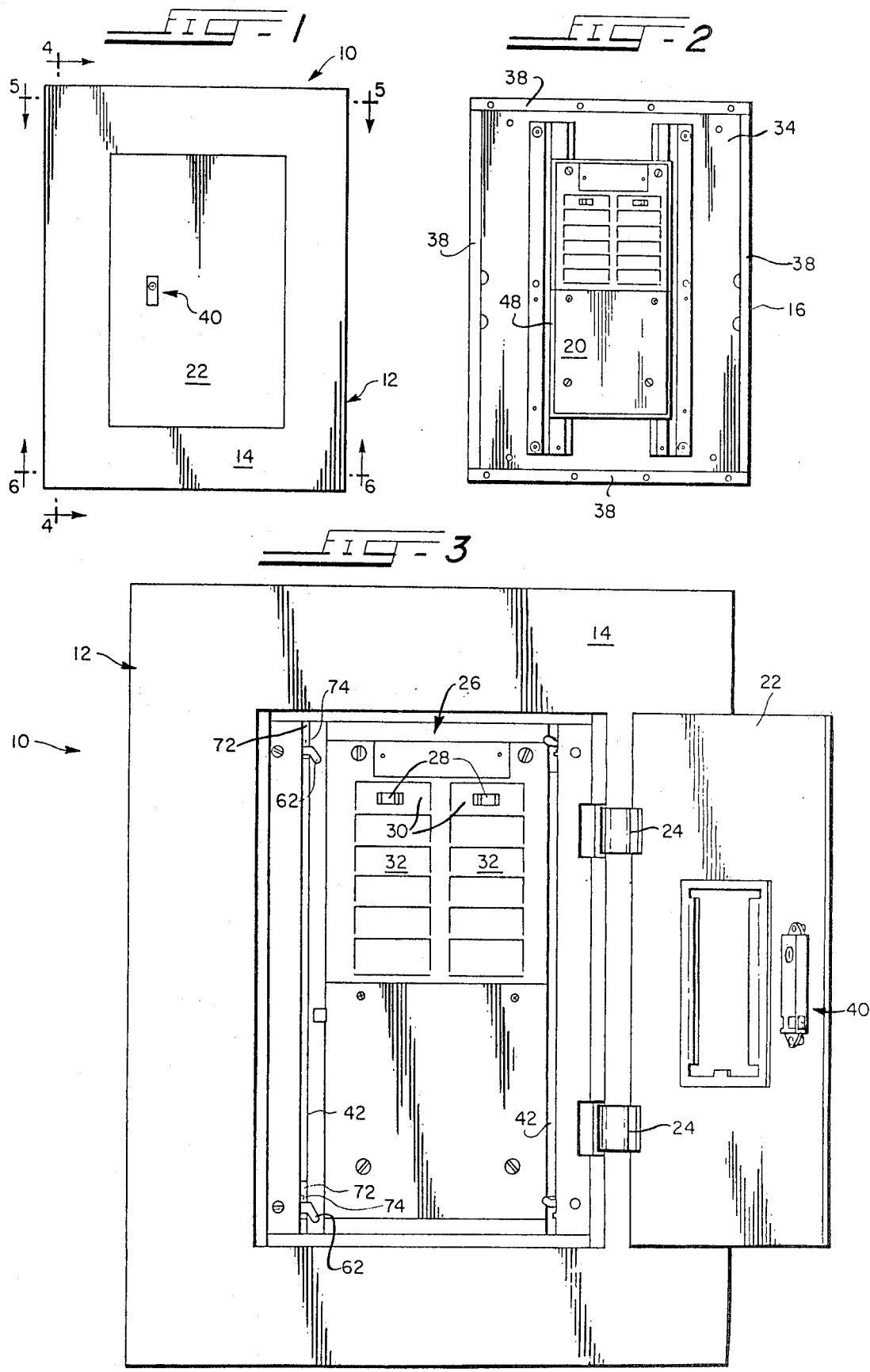

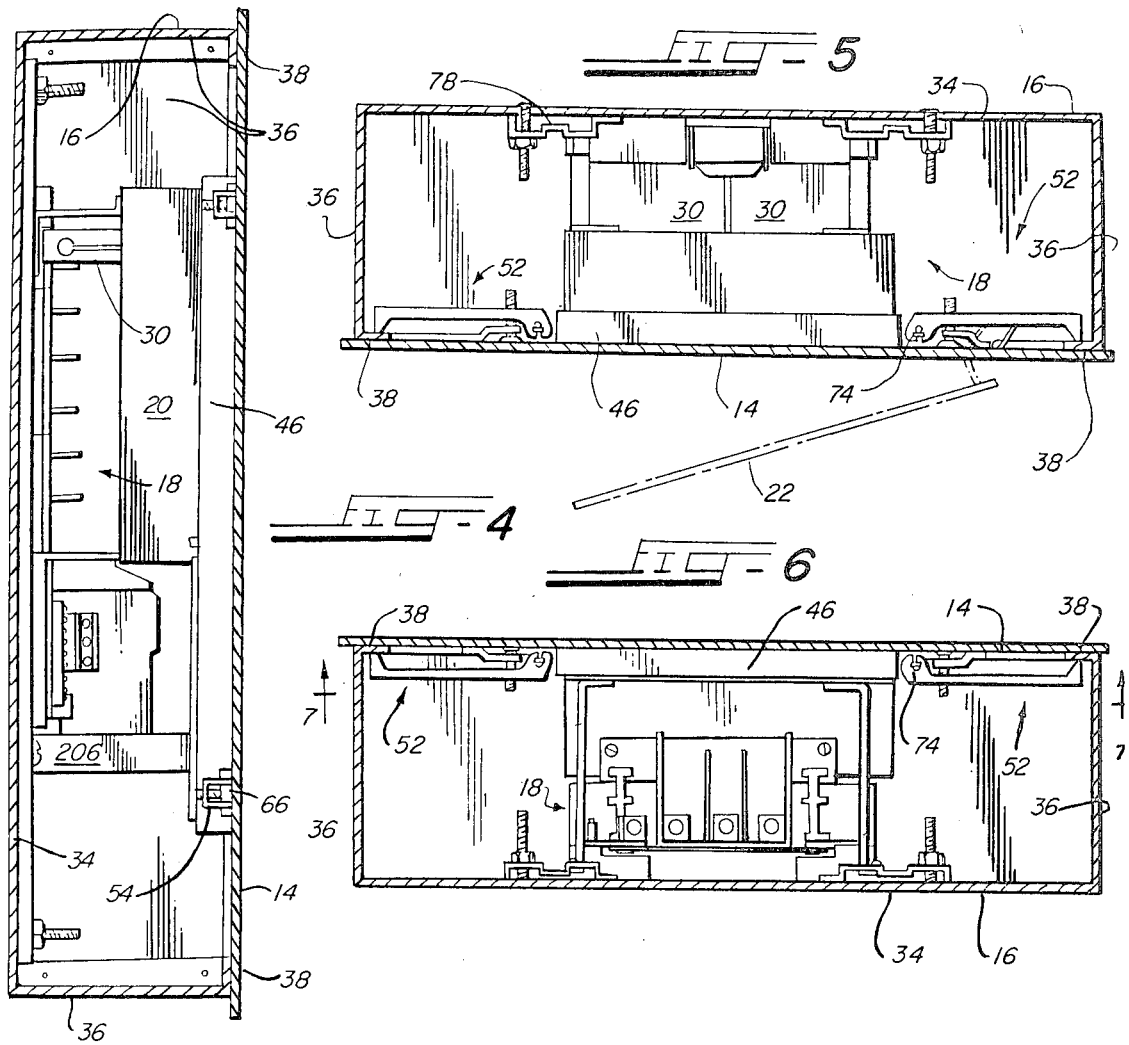

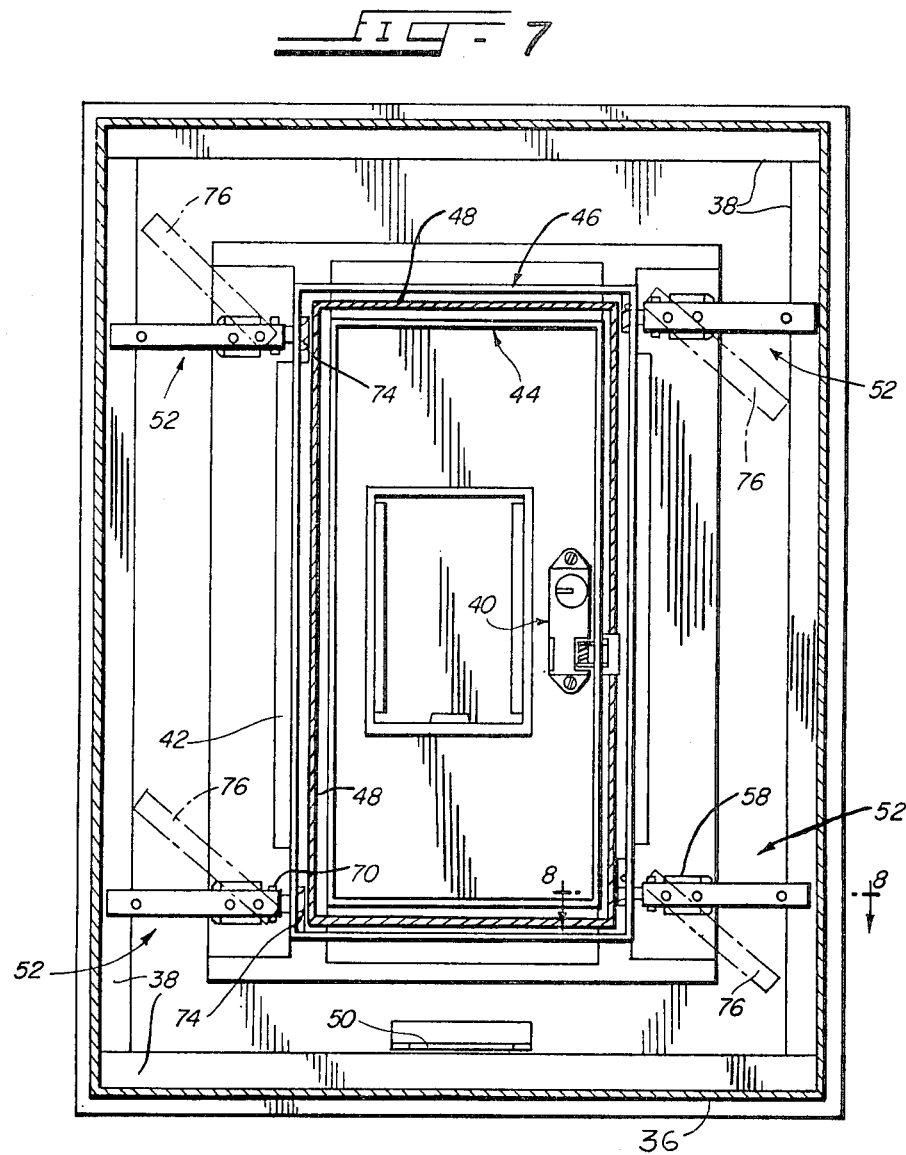
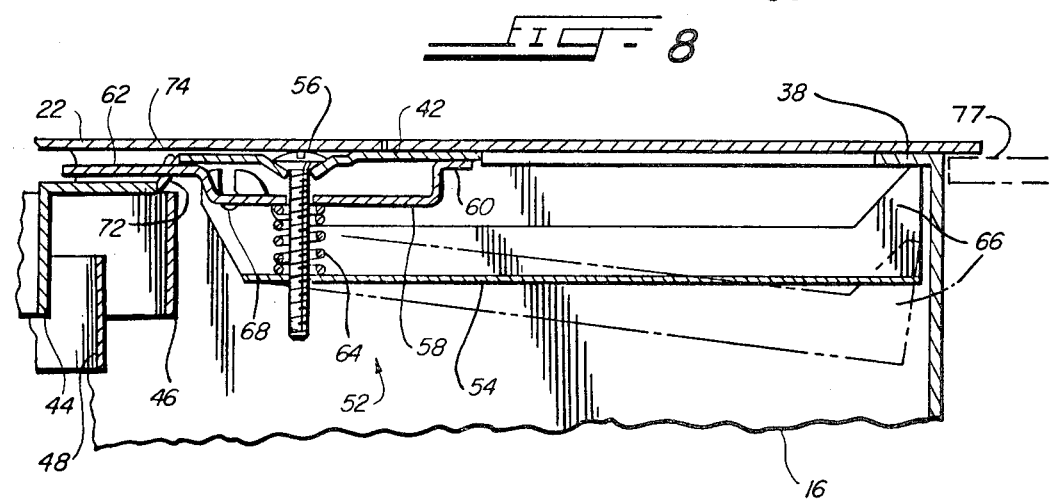

COVER ASSEMBLY FOR PANELBOARD

BACKGROUND OF THE INVENTION

Field of the Invention

This invention relates in general to panelboard assemblies and more particularly to an improved cover assembly for latching a panelboard cover to an enclosure.

Summary of the Prior Art

In a typical panelboard assembly a latch clamp assembly is rotatably secured to a panelboard cover and secures the panelboard cover to the cabinet by engagement with the panelboard hopper. The clamp assembly includes a clamp member bent into different planes, which does not offer the rigidity required for large heavy covers.

Securing the cover to the hopper or interior trim assembly may also require the entire interior assembly to be adjustably positioned relative the back wall of the cabinet, if it is desired to have the cover snuggly fitted against an adjacent wall or plasterboard portion.

SUMMARY OF THE INVENTION

The clamp assemblies of the present invention are provided on a cover cooperating with a panelboard assembly of the type disclosed in a copending application filed simultaneously herewith by Diersing, Schweikle and Stanback. The cover carries a conventional door through which access is normally provided to the circuit breaker handles after the cover is secured to the cabinet. The cover extends beyond the edges of the cabinet and carries a plurality of latch clamp assemblies of economical and sturdy design including a U-shaped clamp member. Each clamp member is pivoted by a lever member to a position permitting the cover to be positioned against the side flanges of the cabinet or an adjacent wall portion and then the clamp members are pivoted so that their ends are located behind the side flanges of the cabinet. The ends of the clamp members are then tightened against the back of the side flanges to snug the cover against either an adjacent wall or against the flanges to eliminate the need for adjustment of the trim assembly. A wide spacing between the interior assembly and the side flanges to provide a wide gutter for accommodating a large number of wires or connections between the interior assembly and the side walls of the cabinet or box requires a large cover and sturdy latch clamps.

It is therefore among the primary objects of the present invention to provide an improved and/or more economical cover assembly for a panelboard cabinet.

Other objects and features of the present invention will become apparent on examination of the following specification and claims together with the drawings.

BRIEF DESCRIPTION OF THE DRAWINGS

FIG. 1 is a front elevational view of a panelboard assembly incorporating the principles of the present invention.

FIG. 2 is a front elevational view of the panelboard assembly shown in FIG. 1 with the cover removed.

FIG. 3 is a front elevational view of the panelboard assembly shown in FIG. 1 with the door in open position.

FIG. 4 is a sectional view taken along the line 4—4 in FIG. 1.

FIG. 5 is a sectional view taken along the line 5—5 in FIG. 1.

FIG. 6 is a sectional view taken along the line 6—6 in FIG. 1.

FIG. 7 is a sectional view taken along the line 7—7 in FIG. 6, and

FIG. 8 is a sectional view taken along the line 8—8 in FIG. 7.

DESCRIPTION OF THE PREFERRED EMBODIMENT

Referring now more specifically to the drawings, a panelboard assembly for use with 277/480 volt A.C., 3 phase, 4 wire systems is indicated in FIGS. 1 and 3 by the reference character 10. The panelboard assembly 10 includes an enclosure or housing 12 having a cover 14 overlapping a cabinet or box 16 seen in FIG. 2, which carries an interior assembly as described in the aforementioned Diersing application. The interior assembly is covered by an interior trim assembly or hopper 20. The trim assembly 20 in turn is hidden or overlapped by a door 22 supported by conventional hinge assemblies 24 on the cover 14 for movement between a closed position and an open position to provide access through opening 26 to the handles 28 of respective circuit breakers 30. The handles 28 project through respective passages in the interior trim assembly 20, which passages are closed by removable plates 32, if the corresponding circuit breaker position is not in use.

The cabinet or box 16 comprises a back wall 34 from which transverse top, bottom and side walls 36 project as best seen in FIGS. 4, 5 and 6. The back wall 34 is fixed or secured to a supporting wall or member in a conventional manner and the walls 36 are provided with conventional knockouts enabling the passage of appropriate wiring contained in the conduits or gutters secured to the box 16. Each of the walls 36 is also provided with an inwardly projecting lip or flange 38 parallel to and spaced from the back wall 34 as best seen in FIGS. 4, 5 and 6 to define an opening permitting removal of the interior trim assembly 20 and connection of the conduit wiring when the cover 14 is removed.

The door 22 carries a spring biased retractable latch assembly 40 for engagement with a keeper formed on one of a plurality of flange walls 42 secured to the interior or rear surface of cover 14 to latch the door in a closed position. The flange walls 42 at their inner edge each have a rearwardly extending lip to define an annular rabbet 44 as best seen in FIG. 7. Rabbett 44 is spaced inwardly from or encircled by a second annular rabbet 46 formed on a flange wall secured to the rear surface of flange walls 42. The rabbets 44 and 46 serve to nestingly receive an outwardly projecting flange wall 48 on interior trim assembly 20 for resisting the deliberate attempt to insert a metal object behind the hopper 20 as disclosed in a copending application filed by Reed. A cover flange 50 is secured to the rear surface of cover 14 and when rested on the lower horizontal lips 38 of box 16 serves to hold the weight of the cover 14, while the cover together with the door are secured to the box 16. The cover 14 secured to the box 16 by means of a plurality of spaced latch lever clamp assemblies 52 which capture a respective side or vertical lip 38 between the clamp assembly 52 and cover 14.

The latch lever clamp assemblies 52 as best seen in FIGS. 4-8 each include a U-shaped elongate clamp 54. Each clamp 54 is secured to the cover 14 adjacent a respective corner of the door opening 26 by a respective screw 56. Each screw 56 passes through an enlarged hole in a side flange wall 42 and an enlarged hole in an offset planar portion of a lever 58 for threaded engagement with the back leg of the U-shaped clamp 54 adjacent one end of the clamp. The lever has spaced L-shaped legs 60 and 62 projecting from opposite ends of the planar portion and rotatably engaged with the rear surface of the side flanges 42. A coil spring 64 encircling screw 56 is located between the back leg of clamp 54 and the offset portion of lever 58 to bias the opposite or free end of the clamp side legs rearwardly from the cover 14, when the screw is loosened. The free end of the clamp side legs each have a projection 66 extending toward the cover 14 for engagement against the rear surface of the respective side lip or flanges 38 to secure the cover 14 to the box 16 when the screw 56 is tightened. The clamp side legs and projections 66 extend transverse to the general plane of lips 38 to ensure rigidity of the clamp and secure engagement of the cover with the box.

Each end of the clamp side legs adjacent the screw 56 are notched to define an enlarged arcuate recess 68 for receiving a respective ear 70 of the lever 58, which passes between the clamp side legs. The clamp 54 and lever 58 can therefor rotate together about the axis of screw 56 and clamp 54 together with screw 56 can pivot relative the general plane of the lever 58 and cover 14.

The leg 62 on the lever 58 projects through a respective elongate opening or passage 72 formed in a rearward bend of the side flanges 42 and provides a visual indication of the angular position of the clamp 54. A detent 74 extends from each side flange 42 intermediate the ends of each passage 72 for engagement with leg 62, when moved between ends of the passage 72 and holds the clamp assemblies from alignment with a horizontal axis as seen in FIG. 7. When leg 62 moves past the detent 74 a tactile and aural indication of the movement of the clamp 54 from an unlatched position indicated by dashed lines 76 to a latched or a locking position is provided, as the lever 58 is pivoted slightly against the bias of spring 64 to permit leg 62 to move past the detent 74.

Thus to assemble the cover 14 to the box 16, each screw 56 is loosened, permitting each leg or tab 62 and the respective clamp to be manually rotated for alignment with a horizontal axis and the clamp projection is spaced from cover 14. The detent 74 engaged with a respective tab 62 holds each clamp in the position indicated by broken lines 76 in FIG. 7 with the clamps spaced from the edges of cover 14 since the radial distance between screw 56 and clamp ends 66 is less then the distance to flanges 38 in the angular position indicated at 76. The cover may now be placed in position with rabbets 44 and 46 nestingly receiving the flange wall 48 of the interior trim assembly and flange 50 resting on the bottom lip 38. Each tab 62 may now be rotated to in turn rotate the respective lever 58 and the clamp 54 into a horizontal position with the projections 66 located behind and in alignment with the side or vertical lips 38 of the box 16. The straight line distance between the flanges and the screws is about $3\frac{3}{4}$" and the distance between projections 66 and the screws is about $4\frac{1}{2}$". As each tab rotates, the respective lever 58 pivots slightly against the bias of spring 64 to enable the tab 62 to pass detent 74. The screws 58 are then tightened to draw the projections 66 on clamps 54 toward the cover 14 against the bias of springs 64. The projections 66 rigidly engage against the rear surface of the lips 38 for securing the cover 14 to the box 16 despite the relatively long distance between the flanges 38 and the screws 56.

It will be noted that the cabinet is substantially 20" wide and 26" long and that over 3" are provided on each side of the interior assembly for wiring. The cover is approximately $21\frac{1}{2}$" wide and $27\frac{1}{2}$" long so that it overlaps the cabinet and may engage an adjacent wall portion such as 77 before engaging the side flanges 38.

If an adjacent wall portion indicated at 77 in FIG. 8 engages the overhang on cover 14 before the cover engages flanges 38, or the wall portion 77 overlaps flanges 38, the cover will be snugged against the adjacent wall portion and spaced from flanges 38. As much as a $\frac{3}{4}$" spacing may thus be provided between flanges 38 and cover 14 to enable the cover to be tightly engaged against an adjacent wall 77. This avoids adjustment in the position of the interior trim assembly to accommodate flush mounting of the cover to such adjacent wall portions.

The foregoing constitutes a description of an improved cover assembly for a high voltage high current panelboard, whose inventive concepts are believed set forth in the accompanying claims.

What is claimed is:

1. A cover assembly for use in a panelboard having a cabinet supporting an interior assembly for extending a plurality of electrical connections with said cabinet including a back wall having a peripheral wall formed by side walls transverse to said back wall with each side wall having projecting flanges in spaced overlapping relationship to said back wall, the improvement comprising:

a cover adapted to extend past each of said flanges,
a plurality of spaced latch lever assemblies,
first pivot means for each latch lever assembly pivotally supporting a respective one of said latch lever assemblies for rotation about a respective axis located at a respective position spaced intermediate said flanges for engaging a respective one of said flanges, and
second means for each first means for pivotally supporting a respective one of said first pivot means for thereafter rotating each latch lever assembly relative said cover about another respective axis for moving said cover toward said flanges.

2. A cover assembly for use in a panelboard having a cabinet supporting an interior assembly for extending a plurality of electrical connections with said cabinet including a back wall having side walls transverse to said back wall with each side wall having projecting flanges in spaced overlapping relationship to said back wall, the improvement comprising:

a cover adapted to extend past each of said flanges, and
a plurality of sapced latch lever assemblies,
each latch lever assembly comprising a U shaped clamp member having side legs transverse to said flanges, a first pivot means extending through said cover and the back leg of said clamp member to provide one axis of rotation spaced intermediate said flanges for rotating each member to a position in registration with said flanges, and second pivot means for rotating each first pivot means and member about a second axis for moving said cover toward said flanges.

3. The improvement claimed in claim 2 in which each lever assembly comprises lever engaged with said clamp member for manually pivoting said clamp member about said axis, and a coil spring between said lever and said clamp member for biasing one end of said side legs from said cover about said other axis transverse to said one axis of rotation.

4. The improvement claimed in claim 3 in which said pivot means comprises a threaded member threaded through said clamp member for moving said one end of said clamp member side legs against said bias toward a respective flange.

5. The improvement claimed in claim 4, means for supporting said lever relative said cover at two spaced positions.

6. The improvement claimed in claim 5, a detent carried by said cover for engaging said lever is response to rotation of said lever between two spaced positions.

7. The improvement claimed in claim 1 in which said interior assembly is overlapped by a trim assembly having a peripheral flange, and said cover includes a pair of spaced rabbets for nestingly receiving said peripheral flange.

8. The improvement claimed in claim 4 in which said cover has a flange for engaging one of said cabinet flanges for carrying the weight of said cover.

* * * * *